Patented Oct. 21, 1924.

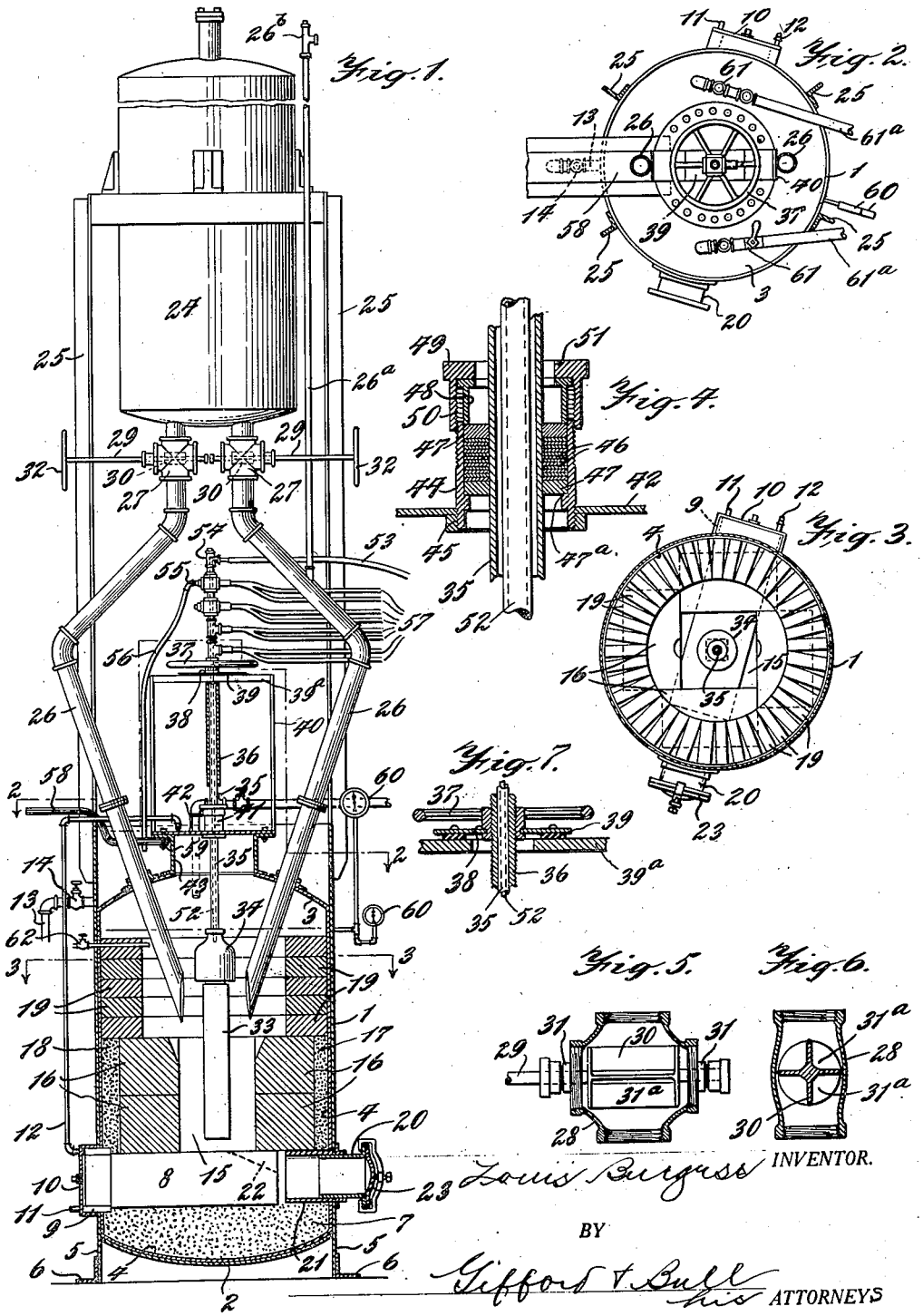

1,512,271

UNITED STATES PATENT OFFICE.

LOUIS BURGESS, OF WESTFIELD, NEW JERSEY, ASSIGNOR, BY MESNE ASSIGNMENTS, TO HIMSELF AND MAURICE BARNETT.

REDUCTION OF OXIDES.

Application filed September 11, 1920. Serial No. 409,589.

*To all whom it may concern:*

Be it known that I, LOUIS BURGESS, a citizen of the United States, residing at Westfield, in the county of Union and State of New Jersey, have invented certain new and useful Improvements in the Reduction of Oxides, of which the following is a specification.

My invention relates to new and useful improvements in the reduction of oxides and oxygenated ores of certain metals and metalloids, the vapor tensions of which, or the reduction products of which, are such that volatilization losses occur at temperatures practically necessary to effect reduction—for example, the oxides or ores of such metals as aluminum, zirconium and beryllium, and of metalloids such as titanium, boron and silicon. In reducing these oxides in the presence of carbon in an electric furnace, appreciable losses occur, with consequent low yields of reduction products, because the oxide, or the reduced element, is volatilized and burned with the carbon monoxide evolved, and, therefore, cannot be recovered. It is, therefore, the object of my present invention to effect the reduction of these oxides or ores in the presence of carbon, and in an electric furnace, without such volatilization as will result in material losses of the materials involved in the reduction, or reduction products from such reaction. With the end in view stated, I perform the reduction of the oxide in the presence of carbon and in an electric furnace, and maintain the reaction zone under such pressure of a suitable gas that volatilization of the oxide or the reduction products is materially reduced or prevented.

The invention is applicable to the reduction of pure, or substantially pure, oxides of said elements—for example, alumina or bauxite containing a high alumina content, silica or sand containing a high percentage of silica, boron trioxide, titania or rutile, which is an ore containing a high percentage of titanium oxide, beryllia and zirconia; or the ores or impure oxides thereof, such as bauxite (consisting principally of alumina and silica), borax, beryl (ore containing principally beryllia and silica); zirkite (ore containing principally zirconia and silica), and clay (ore containing principally alumina and silica). The product resulting from the process is determined by the oxide or ore treated and the proportion of carbon employed, and may be briefly explained as follows:

When using a pure, or substantially pure, oxide—for example, any of those above mentioned—and sufficient carbon, the product will be the substantially pure carbid.

When using a pure, or substantially pure, oxide—for example, any of those above mentioned—and less than enough carbon to make pure carbid, the product will be a mixture of the carbid and the metal or metalloid element of the oxide reduced.

In both of the above examples it is desirable to employ sufficient carbon to effect the desired reduction without permitting destructive reaction upon the carbon which may form part of the furnace structure or the electrodes. Thus, in the first example—i. e., when using substantially pure oxides or ores—carbon should be used in sufficient quantity to eliminate the oxygen present as CO—that is, in theoretical combining proportion—and sufficient in excess of such proportion to form a percentage of carbid; while in the second example—i. e., when using the ores or impure oxides—enough carbon should be used to eliminate the oxygen present as CO, and, if necessary, to neutralize any tendency of the reduced material to react with the carbon structure of the furnace.

In the cases of the ores, it will be noted that certain of them consist of the oxide of a metal (aluminum, beryllium or zirconium), and a percentage of the oxide of a metalloid of the carbon group—e. g., silicon. When reducing these ores according to my invention, it is only necessary to use enough carbon to eliminate the oxygen as CO—i. e., in theoretical combining proportions—because the reduced metalloid neutralizes the tendency of the metal to absorb carbon from the furnace structure, and the resultant product is a silicid of the metal with an excess of either element, according to the proportions of the metal element and metalloid element in the ore employed. This applies to bauxite, containing in the anhydrous condition approximately 20% of silica, to zirkite, to beryl, and to clay. The same result may be effected by making mixtures of the pure oxide with silica in the necessary proportion to have the neutralizing effect described.

Instead of making a mixture of the metal oxide with silica in the necessary proportions, I may use either pure titania or the crude form of titanium oxide known as rutile, in place of silica, the product in such case being a titanid of the metal element, and an excess of the metal element or the metalloid element, according to which predominates chemically in the mixture reduced.

In carrying out the process constituting my present invention, I prefer to perform the reduction in an electric furnace operating on the arc principle; and in the accompanying drawing I have illustrated a furnace of this type, and will describe the invention in connection therewith, although I wish it understood that I do not limit my invention to the particular type of furnace shown, as I can perform the process in any electric furnace which will efficiently maintain proper conditions of pressure and temperature.

In the accompanying drawings, Figure 1 is a view in vertical elevation, partly in vertical central section, of a preferred form of apparatus for practicing my invention.

Fig. 2 is a section on the line 2—2 of Fig. 1.

Fig. 3 is a section on the line 3—3 of Fig. 1.

Fig. 4 is a detail vertical section through a stuffing-box employed.

Fig. 5 is a longitudinal section through a charging device, shown in elevation in Fig. 1.

Fig. 6 is a section at a right angle to that shown in Fig. 5, and

Fig. 7 is a detail sectional view of electrode-adjusting means employed.

In Figs. 1, 2 and 3 the drawings are on a scale of one-half (½) inch to one (1) foot, being a reproduction of an apparatus I have actually used in the performance of the process.

Referring to the drawing, the furnace is shown as consisting of a cylindrical steel shell 1, having a closed bottom or floor 2 and a head 3, the side wall or shell 1 extending above the head to provide a receptacle to retain a cooling fluid such as water on the head to cool the latter. The sides and bottom of the shell are lined with a suitable asbestos lining 4. The lower end of the shell 1 may also extend below the bottom 2 to provide a support, as at 5, upon which the furnace rests, and by which it may be secured to a foundation, for example, by angles 6. In the shell, and on the bottom thereof, is a bed 7 consisting of finely ground carbon, preferably tamped into place, and on this carbon bed is arranged a carbon element 8 constituting one electrode to provide the necessary arc. The carbon element 8 is seated in a water-jacketed metal seat or holder 9, held in a socket or recess 10 in the wall 1 in the side of the shell, by means of which electrical contact is established between said carbon element 8 and the shell. The jacket 9 receives water through an inlet pipe 11, the water being discharged through an outlet pipe 12, the outlet of which delivers the water upon the head of the apparatus. The water pools upon the head and may be drawn off through a pipe 13 containing a valve 14. Upon the carbon bed and over the electrode 8 is a pit 15, the wall of which is built up of a plurality of carbon blocks 16, shown in section in Fig. 1, and in full and dotted lines in Fig. 3, said blocks being spaced apart from the shell 1 to provide an annular space 17, in which space is tamped finely ground carbon 18, upon the upper surface of which rests a fire-brick lining 19, which also rests upon the blocks 16. In the side of the shell is a tap-hole 20 communicating with an internal conduit 21 which communicates with a trough or groove 22 in the upper surface of the electrode 8. By means of the tap-hole 20, conduit 21 and trough 22, molten reduced contents of the pit 15 may be withdrawn. The tap-hole 20 is closed by any suitable tight cap or closure 23 which will seal the tap-hole during running of the furnace, but which may be conveniently removed when the furnace contents are to be withdrawn.

Above the furnace is a feed hopper or receptacle 24 adapted to contain the charge containing the oxide to be reduced, and supported by a suitable superstructure 25 on the furnace. This hopper 24 communicates with the interior of the furnace by means of feed pipes 26, the discharge ends of which terminate within the chamber formed by the lining 19, and just above the pit 15. Each of the pipes 26 is provided with a feed mechanism 27, of any desired type, preferably a rotary measuring valve for feeding measured charges of solid materials to the furnace. In Figs. 5 and 6 I have shown one of these devices in detail, the same consisting of a casing 28 in the feed pipe, through which casing extends a shaft 29 upon which are arranged vanes 30, preferably four in number, forming charge-receiving pocket 31ª, and also acting as valve means for establishing and cutting off feed of the hopper contents to the furnace. The shaft 29 extends through stuffing-boxes 31, and carries on one end a hand-operating device 32 by which the valve may be rotated to feed the charge at the desired rate.

Connected to and communicating with one of the pipes 26 is a pressure-relief pipe 26ª carrying an automatic blow-off valve 26ᵇ set to automatically relieve the pressure within the furnace should the same rise excessively above the operative pressure employed in the process.

Arranged centrally of the pit 15 and above the electrode 8 is a cooperating electrode 33, preferably composed of carbon material such as is commonly used in electrodes employed for arc furnace purposes. The electrode 33 is carried at its upper end by a water-cooled electrode holder 34, which is supported by a copper pipe 35, which, in turn, is connected to a threaded sleeve 36 threaded into the hub of a regulating wheel 37, said hub having a circumferential groove receiving bearing or retaining plates 39, supported by a cross-piece 39ª on but insulated from brackets 40 mounted on the upper end of the furnace. The pipe 35 extends through a stuffing-box 41 mounted on a removable head 42 closing a manhole 43 in the head 3 of the furnace. The stuffing-box 41 comprises a shell 44 threaded, as at 45, into the head 3, through which shell 44 extends the pipe 35. Within the shell and surrounding the pipe, and forming a gas-tight joint between the pipe and the shell, is an insulating packing, consisting preferably of rubber rings 46 surrounding the pipe 35 and held between blocks of asbestos-wood or other suitable material 47, the lower of which rests on a shoulder 47ª on the sleeve 44. The rings are clamped between said blocks of asbestos-wood by means of a gland 48 resting on the upper block and pressed against the same by a packing nut 49 having a portion 50 threaded onto the shell 44 and having at its upper end an inwardly overhanging flange 51 which engages the upper end of the gland 48. By this arrangement, the pipe 35 may slide through the stuffing-box, but escape of gas at this point from the interior of the furnace is prevented. Cooling fluid is admitted to the pipe 35 by an internal pipe 52 fed through a hose 53 and coupling 54, and escapes through an outlet coupling 55 and hose 56, which also discharges onto the head of the furnace. The bearing 39 is properly insulated from the supporting member 39ª. It will be seen that by rotating the wheel 37, the electrode 33 may be vertically adjusted to vary the distance between the lower end of the same and the opposing electrode 8.

The electrical circuit is established by means of electrical connections 57, of any suitable type, electrically connected to the upper end of the pipe 35, and by a bus 58 electrically connected, as at 59, to the shell 1, which, as heretofore stated, is electrically connected to the electrode 8. The furnace is preferably provided with pressure gauges 60, and also with one or more exhaust valves 61, by means of which the pressure may be regulated and the excess gas be permitted to escape, the valves 61 being located in pipes 61ª.

It will be understood that the furnace is closed against escape of gases constituting the pressure medium, whether generated as the result of the reaction—for example, carbon monoxide—or established by admitting suitable gas to the furnace—for example, hydrogen—or suitable hydrocarbon gas inert chemically to the materials involved. When gas is to be admitted from an external source, a suitable valved coupling 62 may be employed for the purpose.

In operating this furnace, a quantity of the charge of the oxide material and carbon, constituted as hereinafter described, is fed from the hoppers into the pit 15, and preferably in such a quantity that the layer of charge will be confined to the said pit 15. The current is then established, and the electrode 33 is adjusted to such a position relative to the electrode 8 as to insure an arc of the desired amperage and voltage. In the operation, to be hereinafter described, it has been found that the maintenance of a voltage of about 42 volts and a current of about 1500 amperes will result in a successful reduction, although I do not limit myself to the current conditions just mentioned, as different voltages and amperage may be employed—for example, as high as 100 volts and 4000 amperes—it being understood that the current condition is regulated, in any suitable manner, so as to produce the desired temperature condition necessary to perform the reduction. It will be understood that the regulation of the current conditions will vary with the size and construction of the furnace employed for the reduction—that is, in small furnaces a low voltage and amperage will operate successfully, while in larger furnaces greater voltage and amperage may be employed in performing the operation. In the furnace illustrated I have employed successfully a voltage of 110 and amperage of 4000. The feeding devices 27 are preferably operated so that the charge will be supplied at a uniform rate.

When the current is established and the reduction takes place, the gases generated, principally carbon monoxide, build up in a comparatively short time to a pressure of the desired degree, which I prefer to be about 15 pounds to the square inch, in excess of atmospheric, and any excess pressure may be released, either manually or automatically, by a valve 61 in an exhaust pipe 61ª. At the end of the operation, which may be conducted for any period of time in practice found satisfactory, the pressure may be released and the reduction product, if molten, tapped out of the furnace through the duct 20. If the reduced material is not molten or fluid, it must, of course, be removed by suitable mechanical means. Although I prefer to employ a pressure of about 15 pounds to the square inch, above atmospheric, I may employ a pressure of, say, as high as 60 pounds to the square inch, and even as high as 100 pounds.

The furnace above described will serve to efficiently reduce the oxides of aluminum, zirconium, beryllium, titanium, boron and silicon, or combinations thereof, and I will now proceed to describe the constitution of the charge and the method of procedure followed with the oxide material of each of these elements. The charge constituted, as hereinafter described, may be either a mixture of the finely divided oxide with carbon, so as to form a granular body, or may be prepared by incorporating the oxide used, preferably in a pulverized and anhydrous condition, with a requisite amount of a suitable hydrocarbon bonding material, preferably a high melting-point pitch, and then coking the same by heating the mass in a suitable container slowly up to a red or yellow heat, preferably in a reducing atmosphere. The percentage of pitch employed should be sufficient to give a satisfactory bond and produce the requisite amount of carbon material resulting from the coking material, or free carbon may be added so that the resultant coke charge contains the desired percentage of carbon. The result of this treatment is to form a supporting structure or matrix of coke, through which the finely divided particles of oxide are disseminated. Such a method is described in my co-pending application, Serial No. 317,687, filed August 15, 1919, now Patent No. 1,379,523, issued May 24th, 1921.

*Aluminum oxide.*—When it is desired to produce aluminum carbid employing relatively pure aluminum oxide—i. e., alumina—the charge is made up to contain the theoretical combining proportions of the oxide and carbon—that is, approximately 204 parts of the oxide to approximately 108 parts of carbon—the resulting product being aluminum carbid ($Al_4C_3$) with a small percentage of aluminum metal intermixed with the carbon, the aluminum carbid being substantially pure. By varying the proportions of the oxide and carbon—for example, using 73 parts of the oxide to 27 parts of carbon—a mixture of aluminum carbid ($Al_4C_3$) and aluminum metal will be produced, in which the carbid does not exist in its pure state, but is mixed with the aluminum metal. This last formula is preferred, as it has the advantage that the reduced material pools well in the furnace and the carbon portions of the furnace structure are not attacked by the melt.

When employing aluminum oxide in the form of bauxite, which contains in its anhydrous condition about 78% of alumina and about 19% of silica, I use the theoretical amount of carbon necessary to reduce the aluminum and the silicon to elemental form—that is, approximately 76 parts by weight of bauxite to 24 parts of carbon—the product being aluminum silicid ($Al_4Si_3$) and elemental aluminum.

I may also proceed by using 73 parts of bauxite to 27 parts of carbon, in which the product will be a mixture of aluminum silicid ($Al_4Si_3$), elemental aluminum, aluminum carbid ($Al_4C_3$) and silicon carbid (SiC). This product has a higher melting point than that from the first-named formula, and is easier to grind.

*Titanium oxide.*—In reducing titanium oxide I use the crude form of the oxide known as rutile, which is mixed with the carbon in theoretical combining proportions of about 80 parts of rutile to 36 parts of carbon, the product being titanium carbid (TiC). By using a greater percentage of rutile, thereby increasing the titanium carbid content in the reduced material, the product is a mixture of titanium and titanium carbid.

*Zirconium oxide.*—In reducing zirconium oxide I preferably employ the crude form of the oxide, known as zirkite, and sufficient carbon to eliminate the oxygen as carbon monoxide—i. e., theoretical combining proportions, the preferred proportions being 100 parts of zirkite to 20 parts of carbon. In this case the product is crude zirconium metal, which contains all the metallic and metalloid products of the zirkite in the form of an alloy or silicid. If desired, the zirkite and carbon may be varied by increasing the amount of carbon, so that there will be sufficient to eliminate the oxygen as carbon monoxide, and a further quantity sufficient to form the carbon. The product is zirconium carbid ($Zr_2C$) with minor percentages of silicon and silicon carbid.

*Beryllium oxide.*—In reducing this oxide I employ the theoretical combining proportions of beryl (crude beryllium oxide) and carbon to eliminate oxygen as carbon monoxide, the proportions being by weight 100 parts of the beryl to 25 parts of carbon. The product is beryllium silicid ($Be_4Si_3$) with a percentage of silicon. By increasing the amount of carbon the product will contain beryllium silicid and a percentage of beryllium carbid ($Be_4C_3$).

*Boron oxide.*—In this case I employ the theoretical proportions of boron oxide ($B_2O_3$) and carbon to eliminate oxygen as CO, and a further quantity of carbon sufficient to form a carbid—for example, 140 parts of boron oxide to 108 parts of carbon. In this case the product is substantially all boron carbid ($B_4C_3$).

*Silicon oxide.*—In this case I employ the theoretical proportions of silica ($SiO_2$) and carbon to eliminate oxygen as carbon monoxide, and a further quantity of carbon sufficient to form a carbid with the silicon— that is, 59 parts of silica to 36 parts of carbon. The product in this case is silicon carbid (SiC). The percentage of silicon in the product may be increased by using less carbon.

In the cases of alumina, titania, boric oxide and silicon oxide, it is desirable to use the carbon according to the combining weights necessary to eliminate oxygen as carbon monoxide, and an additional quantity of carbon sufficient to form a substantial quantity of carbid, in order to prevent reaction between the oxide and any carbon structure of the furnace, so as to prevent destruction of the latter.

This is not necessary in the case of bauxite, clay, beryl and zirkite, because these materials reduce with theoretical parts of carbon without attacking the carbon parts of the furnace.

The time of reduction, employing the furnace herein shown and described, and a current of voltage and amperage mentioned, would be in the neighborhood of one-half hour, working in a batch charge—that is, where the charge is not replenished as the reaction takes place.

From the above, it will be seen that the product, when using substantially pure oxide with enough carbon, is the pure carbid of the metal or metalloid, but when using less than enough carbon to make the pure carbid, is a mixture of the carbid and the element. When using the oxide of the metallic elements—namely, aluminum, zirconium and beryllium—instead of using an excess of carbon, I may use a theoretical proportion of carbon, elemental silicon or titanium mixed with the oxide, but in this case the preferred method is to add the oxide of silicon or titanium and reduce it at the same operation, in which case the product is a silicid of the metallic element, or titanid of the metallic element admixed with a percentage of either element employed.

While I have described above the process embodying my invention as being performed in connection with certain named oxides, I desire it understood that a recital of these oxides is in no sense limiting, as the invention is applicable to all oxides the vapor tensions of which, or the reduction products of which, are such that volatilization losses occur at temperatures practically necessary to effect reduction.

What I claim and desire to secure by Letters Patent of the United States is:

1. The process of reducing metal and metalloid oxides, which consists in subjecting divided oxide in contact with carbon to the direct heat of an electric arc in an enclosed space maintained under pressure of gas sufficient to prevent substantial volatilization.

2. The process of reducing metal and metalloid oxides, which consists in subjecting the divided oxide in contact with carbon to the direct heat of an electric arc in an enclosed space maintained under pressure of gas generated by the reaction, and sufficient to prevent substantial volatilization of the materials involved.

3. The process of producing metal and metalloid oxides, which consists in subjecting the divided oxide in contact with carbon to electric heat in an enclosed space maintained under pressure of gas, tapping the molten product, and replenishing the charge during reduction.

4. The process of reducing metal and metalloid oxides, which consists in subjecting a mass of divided oxide in contact with carbon to electric heat in an enclosed space maintained under pressure of gas sufficient to maintain the boiling point of said mass above the temperature thereof.

5. The process of reducing metal and metalloid oxides, which consists in subjecting the divided oxide in contact with carbon to electric heat in an enclosed space maintained under pressure of gas generated by the reaction, said pressure being approximately 15 pounds to the square inch above atmospheric.

6. The process of reducing metal and metalloid oxides, which consists in subjecting a mass consisting of divided oxide-bearing material encased in a supporting structure of coke to the heat of an electric arc in an enclosed space maintained under pressure of gas generated by the reaction.

7. The process of reducing metal and metalloid oxides, which consists in subjecting divided oxide in contact with carbon to the direct heat of an electric arc in an enclosed space maintained under pressure of gas chemically inert in relation to the materials involved.

8. The process of reducing aluminum oxide, which consists in subjecting divided aluminum oxide in contact with carbon to the direct heat of an electric arc in an enclosed space maintained under pressure of gas chemically inert in relation to the materials involved.

9. The process of reducing aluminum oxide, which consists in subjecting divided aluminum oxide in contact with carbon to electric heat in an enclosed space maintained under pressure of gas at about 15 pounds to the square inch above atmospheric.

10. The process of reducing aluminum oxide, which consists in subjecting divided aluminum oxide in contact with carbon to electric heat in an enclosed space maintained under pressure of gas generated by the reaction, said pressure being approximately 15 pounds to the square inch above atmospheric.

11. The process of reducing aluminum oxide, which consists in subjecting divided aluminum oxide in contact with carbon to electric heat in an enclosed space maintained under pressure of gas generated by the reaction, said pressure being 15 pounds or more to the square inch.

12. The process of reducing aluminum oxide, which consists in subjecting aluminum oxide in contact with carbon to electric heat in an enclosed space maintained under pressure of gas, tapping the molten product, and replenishing the charge of divided oxide and carbon during reduction.

In testimony whereof, I have hereunto signed my name, in the presence of two subscribing witnesses.

LOUIS BURGESS.

Witnesses:
AGNES E. CUNNEEN,
D. L. WOOD.